US009105209B2

(12) United States Patent
Kita et al.

(10) Patent No.: US 9,105,209 B2
(45) Date of Patent: Aug. 11, 2015

(54) DISPLAY DEVICE

(71) Applicant: Panasonic Liquid Crystal Display Co., Ltd., Himeji-shi, Hyogo (JP)

(72) Inventors: Kazuo Kita, Osaka (JP); Genshiro Kawachi, Osaka (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 83 days.

(21) Appl. No.: 13/708,333

(22) Filed: Dec. 7, 2012

(65) Prior Publication Data

US 2013/0147780 A1 Jun. 13, 2013

(30) Foreign Application Priority Data

Dec. 12, 2011 (JP) ................................ 2011-271137

(51) Int. Cl.
*G06F 3/038* (2013.01)
*G09G 5/00* (2006.01)
*G09G 3/36* (2006.01)
*G09G 3/32* (2006.01)

(52) U.S. Cl.
CPC .............. *G09G 5/001* (2013.01); *G09G 3/3688* (2013.01); *G09G 3/3275* (2013.01); *G09G 2300/0408* (2013.01); *G09G 2300/0426* (2013.01); *G09G 2310/0297* (2013.01); *G09G 2320/0209* (2013.01); *G09G 2320/0219* (2013.01)

(58) Field of Classification Search
CPC ... G09G 5/001; G09G 3/3275; G09G 3/3688; G09G 2300/0408; G09G 2300/0426; G09G 2310/0297; G09G 2320/0209; G09G 2320/0219; G09G 5/00; G06F 3/038
USPC ........................................................ 345/211
See application file for complete search history.

(56) References Cited

U.S. PATENT DOCUMENTS

| | | | | |
|---|---|---|---|---|
| 5,488,415 | A | 1/1996 | Uno | |
| 2001/0043180 | A1* | 11/2001 | Mori et al. | 345/87 |
| 2003/0090614 | A1 | 5/2003 | Kim et al. | |
| 2006/0022909 | A1 | 2/2006 | Kwak et al. | |
| 2011/0074747 | A1* | 3/2011 | Watanabe et al. | 345/204 |

FOREIGN PATENT DOCUMENTS

| | | |
|---|---|---|
| JP | 7-161975 | 6/1995 |
| JP | 7-203319 | 8/1995 |
| JP | 2001-109435 | 4/2001 |
| JP | 2006-039505 | 2/2006 |
| JP | 2006-308711 | 11/2006 |
| JP | 4027691 | 10/2007 |
| JP | 2011-180622 | 9/2011 |

* cited by examiner

*Primary Examiner* — Aneeta Yodichkas
*Assistant Examiner* — Brent D Castiaux
(74) *Attorney, Agent, or Firm* — Hamre, Schumann, Mueller & Larson, P.C.

(57) ABSTRACT

In a liquid crystal display device, a data signal generation unit generates a data signal for controlling the orientation of liquid crystal. A plurality of transistors supply the data signal output from a source IC unit to a plurality of data signal lines of a liquid crystal display panel in a time sharing manner. A gate signal line controls each of the plurality of transistors. A fluctuation suppression unit is connected to the gate signal line that controls any one of the plurality of transistors, and suppresses, in accordance with a gate signal of the connected gate signal line, a voltage fluctuation in the data signal which occurs when another transistor changes from the ON state to the OFF state.

5 Claims, 5 Drawing Sheets

DISPLAY DEVICE

CROSS-REFERENCE TO RELATED APPLICATION

The present application claims priority from Japanese application JP2011-271137 filed on Dec. 12, 2011, the content of which is hereby incorporated by reference into this application.

BACKGROUND OF THE INVENTION

1. Field of the Invention

The present invention relates to a display device.

2. Description of the Related Art

Conventionally, there is known a display device in which display is controlled by changing a voltage to be applied to each pixel in a display panel. Known examples include a liquid crystal display device for changing a voltage to be applied to a liquid crystal composition sealed in a liquid crystal display panel, and an organic EL display device. In such a display device, a pixel electrode is disposed in a region surrounded by data signal lines (image signal lines) and scanning signal lines that intersect with each other, and each pixel electrode is applied with a grayscale voltage from a data signal supplied via the data signal line.

For example, Japanese Patent Application Laid-open No. 2001-109435 and Japanese Patent No. 4027691 describe a display device in which a plurality of data signal lines are defined as a set and a plurality of sets of data signal lines are arranged in a display panel and which includes a selector circuit for switching a data signal line to be connected to an output terminal for outputting a data signal.

SUMMARY OF THE INVENTION

In Japanese Patent Application Laid-open No. 2001-109435 and Japanese Patent No. 4027691, however, when a transistor included in the selector circuit changes from the ON state to the OFF state, a feedthrough voltage is generated due to the parasitic capacitance of the transistor (such as the gate-drain parasitic capacitance). As a result, a voltage fluctuation occurs in the data signal, and hence a correct grayscale voltage cannot be applied to a pixel electrode.

To deal with this problem, it is conceivable to connect a transistor between the selector circuit and the data signal line and drive the transistor with the use of a gate signal in antiphase to a gate signal input to the selector circuit, to thereby cancel out the voltage fluctuation caused by the feedthrough voltage. In this case, however, it is necessary to provide an additional gate signal line for operating the above-mentioned transistor, resulting in a problem in that the display device is increased in size and power consumption.

The present invention has been made in view of the above-mentioned problem, and it is an object thereof to provide a display device capable of reducing the influence of a feedthrough voltage while achieving downsizing and power saving.

According to an exemplary embodiment of the present invention, there is provided a display device, including: a data signal generation unit for generating a data signal for controlling a pixel; a plurality of transistors for supplying the data signal output from the data signal generation unit to a plurality of data signal lines of a display panel in a time sharing manner; a gate signal line for controlling each of the plurality of transistors; and a fluctuation suppression unit connected to the gate signal line that controls any one of the plurality of transistors, for suppressing, in accordance with a gate signal of the connected gate signal line, a voltage fluctuation in the data signal which occurs when another one of the plurality of transistors changes from an ON state to an OFF state. According to this exemplary embodiment of the present invention, the influence of the feedthrough voltage can be reduced while achieving downsizing and power saving of the display device.

Further, according to another exemplary embodiment of the present invention, the fluctuation suppression unit suppresses the voltage fluctuation in the data signal in accordance with a change in the gate signal of the connected gate signal line in a period from when the another one of the plurality of transistors has changed from the ON state to the OFF state until write timing of the data signal. According to this exemplary embodiment, the potential of the data signal can be maintained until the write timing, and hence an accurate grayscale voltage can be applied to a pixel electrode.

Further, according to still another exemplary embodiment of the present invention, the one of the plurality of transistors, which is controlled by the gate signal line connected to the fluctuation suppression unit, changes from the OFF state to the ON state in a case where the another one of the plurality of transistors changes from the ON state to the OFF state, and the fluctuation suppression unit suppresses the voltage fluctuation in the data signal in accordance with the gate signal that controls the one of the plurality of transistors, which is controlled by the connected gate signal line, so as to change from the OFF state to the ON state. According to this exemplary embodiment, at the timing at which a potential drop occurs due to the feedthrough voltage, a potential increase for cancelling out the potential drop can be applied to the data signal.

DETAILED DESCRIPTION OF THE INVENTION

Referring to the accompanying drawings, a display device according to an embodiment of the present invention is described in detail below. The following exemplifies the application of the display device according to the present invention to a liquid crystal display device.

Figure 1:
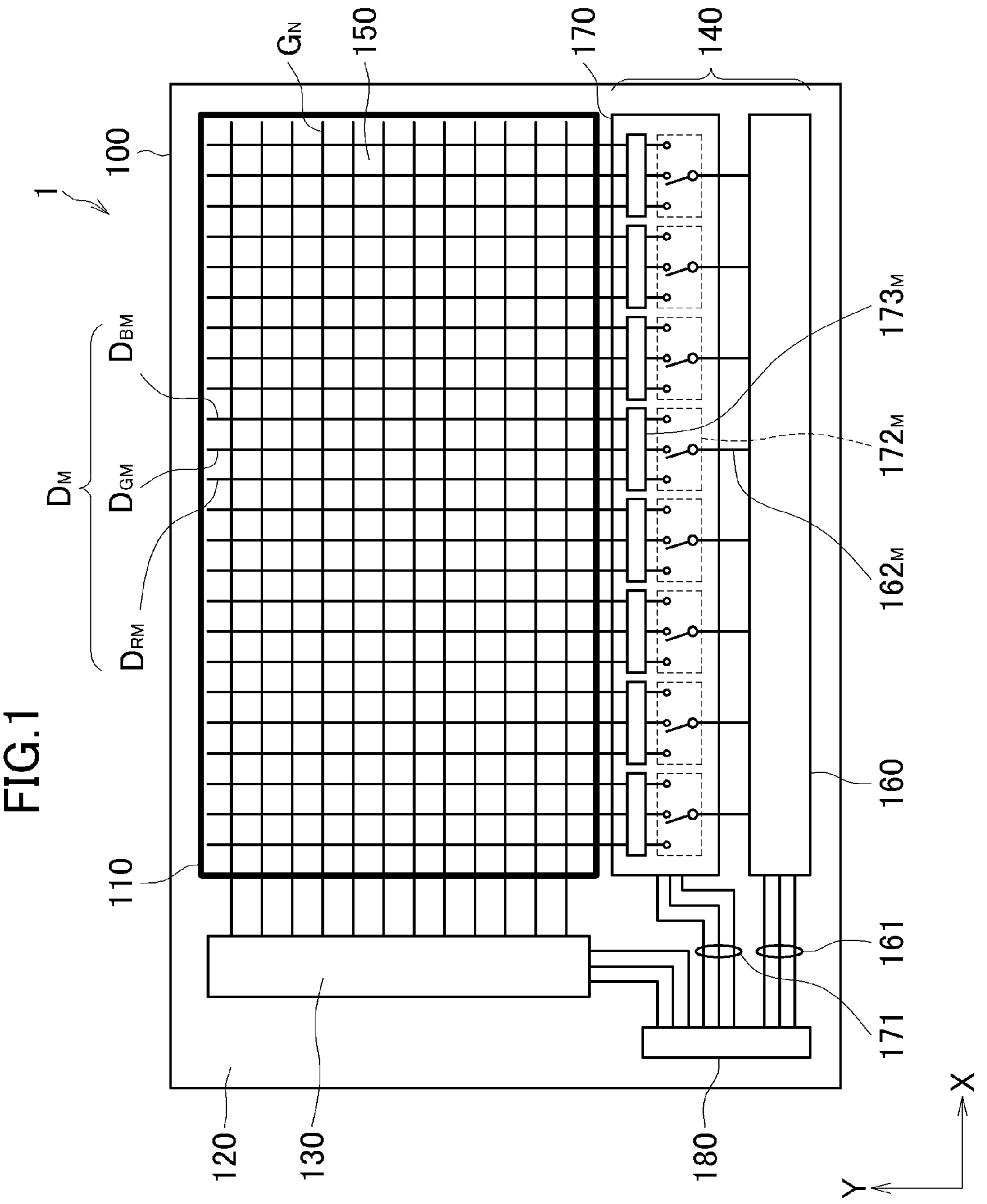
FIG. 1 is a diagram illustrating a liquid crystal display device according to an embodiment of the present invention.

FIG. 1 is a diagram illustrating a liquid crystal display device according to this embodiment. As illustrated in FIG. 1, a liquid crystal displaypanel 100 of a liquid crystal display device 1 includes two substrates, a color filter substrate 110 and a TFT substrate 120. A liquid crystal composition is sealed between the color filter substrate 110 and the TFT substrate 120. Note that, the liquid crystal display device 1 includes a power supply circuit (not shown), and the power supply circuit supplies a power supply voltage to each component of the liquid crystal display panel 100.

Scanning signal lines $G_N$ controlled by a scanning signal drive circuit 130 and data signal lines $D_M$ controlled by a data signal drive circuit 140 are wired throughout the TFT substrate 120. The scanning signal lines $G_N$ and the data signal lines $D_M$ form pixel portions 150 of the liquid crystal display device 1. Note that, M of the data signal lines $D_M$ and N of the scanning signal lines $G_N$ are natural numbers corresponding to the number of columns and the number of lines of the pixel portions 150, respectively.

Although simplified in FIG. 1, the liquid crystal display panel 100 includes the pixel portions 150 in number corresponding to the resolution. For color display, the liquid crystal display panel 100 in this embodiment includes the pixel portions 150 corresponding to n colors (n is a natural number; in this embodiment, n is 3). In this embodiment, for example, the pixel portions 150 corresponding to red (R), green (G), and blue (B) are repeatedly arranged in order from the left of FIG. 1 (in ascending order of X coordinate).

The scanning signal line $G_N$ is supplied with a scanning signal from the scanning signal drive circuit 130. A thin film transistor included in the pixel portion 150 is turned ON/OFF based on the scanning signal. The data signal line $D_M$, on the other hand, is supplied with a data signal from the data signal drive circuit 140. When the thin film transistor in the pixel portion 150 is turned ON (when write timing has come), the data signal is supplied from the data signal line $D_M$ so that a grayscale voltage is applied to a pixel electrode, thereby changing the orientation direction of liquid crystal molecules of the liquid crystal composition. As a result, light transmissivity changes, thereby performing display control of the liquid crystal display device 1.

Note that, the liquid crystal display panel 100 may employ an in-plane switching (IPS) mode in which two electrodes are provided on the TFT substrate 120 or alternatively a twisted nematic (TN) or vertical alignment (VA) mode in which an electrode is provided on each of the color filter substrate 110 and the TFT substrate 120.

As illustrated in FIG. 1, the data signal drive circuit 140 includes a source IC unit 160 and a distribution control unit 170. The source IC unit 160 is connected to a controller 180 via a data bus line 161. The distribution control unit 170, on the other hand, is connected to the controller 180 via a distribution control signal line 171.

The controller 180 acquires at least display information and a control signal from an external device (such as a flexible board (not shown)). The control signal output from the controller 180 includes timing signals such as a clock signal for the source IC unit 160 to fetch the display information, a time sharing control signal for switching the output of the distribution control unit 170 to the data signal line $D_M$, a frame start instruction signal for driving the scanning signal drive circuit 130, and a gate clock signal for sequentially outputting the scanning signals.

The display information output from the controller 180 is input to the source IC unit 160 via the data bus line 161. Pieces of the display information are output through the data bus line 161 in a predetermined order. The source IC unit 160 fetches data to be displayed from among the pieces of display information output in order. Timing at which the source IC unit 160 fetches the display information is based on the clock signal output from the controller 180. Note that, a signal line for the source IC unit 160 to acquire the clock signal from the controller 180 is omitted in FIG. 1. The signal to be acquired from the external device is not limited to the above-mentioned control signal. For example, when the liquid crystal display device 1 has a potential conversion function such as a level shifter, a power supply line maybe included in the liquid crystal display device 1.

The source IC unit 160 is disposed in, for example, the lateral direction (X axis direction) along the periphery of the TFT substrate 120. In this embodiment, the source IC unit 160 functions as a data signal generation unit for generating a data signal for controlling the pixel portion 150 (that is, the orientation of liquid crystal).

For example, the source IC unit 160 acquires display information from the controller 180 via the data bus line 161, thereby generating and outputting a data signal. For example, the source IC unit 160 converts the display information input from the controller 180 into a data signal indicating a grayscale voltage corresponding to the display information, and outputs the data signal to the distribution control unit 170 via an output signal line 162.

Note that, in this embodiment, the number of the output signal lines 162 corresponds to the number "M" of the data signal lines $D_M$. The output signal line 162 corresponding to the data signal line $D_M$ is hereinafter referred to as "output signal line $162_M$".

The distribution control unit 170 is connected to the output signal line $162_M$. The output of the distribution control unit 170 is connected to the data signal line $D_M$. The distribution control unit 170 supplies the data signal output from the source IC unit 160 to the plurality of data signal lines $D_M$ in a time sharing manner. In other words, the distribution control unit 170 switches the connections between the output signal line 162 of the source IC unit 160 and the plurality of data signal lines $D_m$. More specifically, the distribution control unit 170 switches the connections between the output signal line $162_M$ and the plurality of data signal lines $D_M$ in accordance with a distribution control signal supplied from the controller 180 via the distribution control signal line 171, and outputs the data signal to the data signal line $D_M$ for a predetermined period.

In this embodiment, the distribution control unit 170 includes a distribution unit $172_M$ and a fluctuation suppression unit $173_M$. Note that, "M" of the distribution unit $172_M$ and the fluctuation suppression unit $173_M$ corresponds to "M" of the data signal line $D_M$.

The distribution unit $172_M$ is connected to the output signal line $162_M$. The connection destination of the output signal line $162_M$ is switched for every predetermined period by the distribution unit $172_M$. Thus, the output of the source IC unit 160 can be input to any one of data signal lines $D_{RM}$, $D_{GM}$ and $D_{BM}$ corresponding to red (R), green (G), and blue (B) pixels, respectively.

For example, in a period during which the source IC unit 160 and the data signal line $D_M$ are connected to each other by the distribution unit $172_M$, a data signal is output from the source IC unit 160 to the data signal line D. Similarly, in a period during which the source IC unit 160 and the data signal line $D_{GM}$ are connected to each other, a data signal is output from the source IC unit 160 to the data signal line $D_{GM}$. In a period during which the source IC unit 160 and the data signal line $D_{BM}$ are connected to each other, a data signal is output from the source IC unit 160 to the data signal line $D_{BM}$.

The fluctuation suppression unit $173_M$ is disposed between the distribution unit $172_M$ and the data signal line $D_M$, and suppresses a voltage fluctuation in the data signal caused by a feedthrough voltage. The feedthrough voltage is generated when the distribution unit $172_M$ switches the connections. The fluctuation suppression unit $173_M$ is driven by the distribution control signal supplied from the controller 180 via the distribution control signal line 171.

Figure 2:
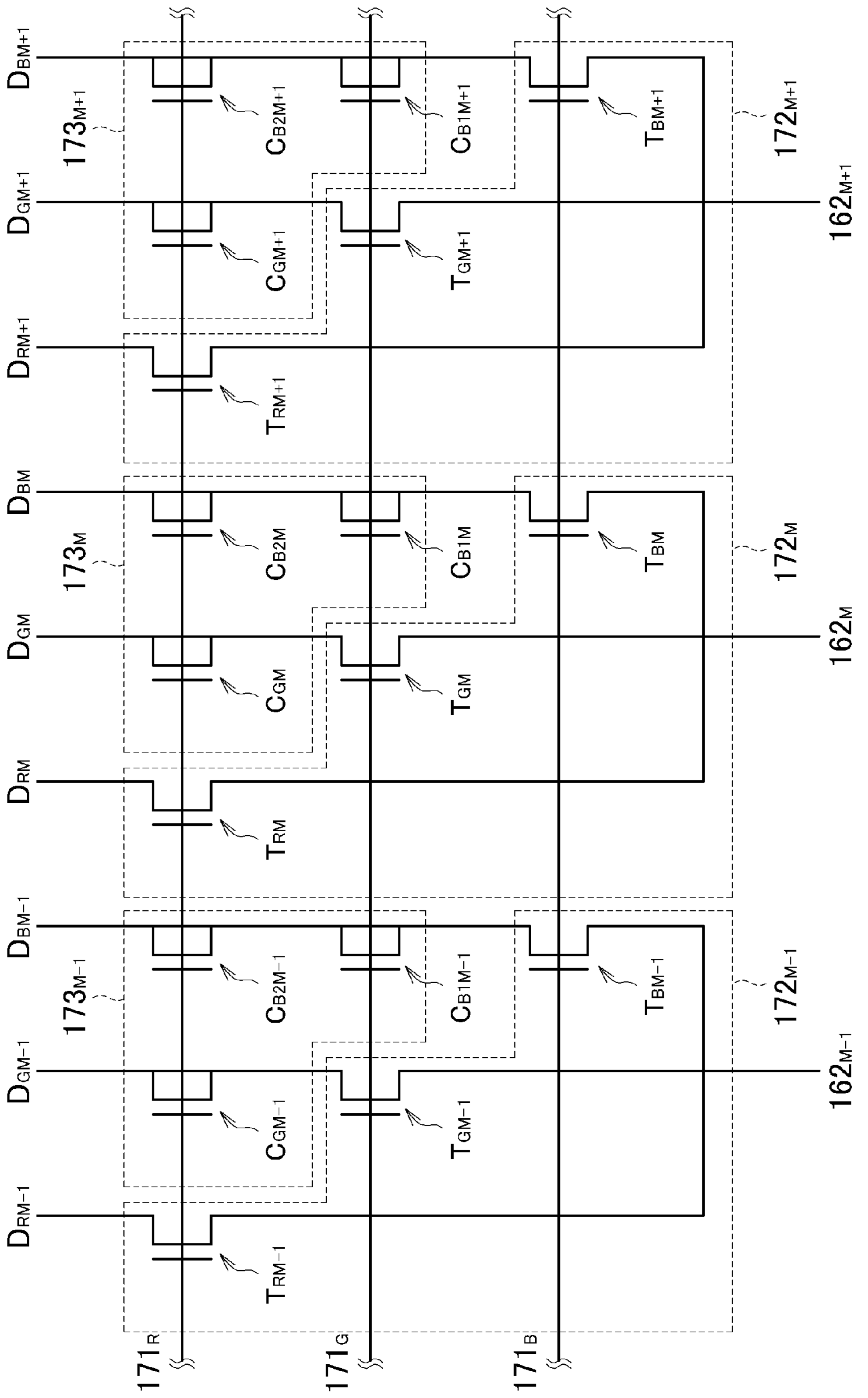
FIG. 2 is a diagram illustrating a detailed configuration of a distribution unit and a fluctuation suppression unit.

FIG. 2 is a diagram illustrating a detailed configuration of the distribution unit 172$_M$ and the fluctuation suppression unit 173$_M$. As illustrated in FIG. 2, the distribution unit 172$_M$ includes transistors $T_{RM}$, $T_{GM}$, and $T_{BM}$ as switching elements (hereinafter sometimes collectively referred to simply as transistor $T_M$). The transistor T maybe formed by a semiconductor of the same conductivity type as the thin film transistor (not shown) provided in the pixel portion 150, for example.

The transistor $T_M$ supplies the data signal, which is input from the source IC unit 160 via the output signal line 162$_M$, to the plurality of data signal lines $D_M$ of the liquid crystal display panel 100 in a time sharing manner. The distribution control signal line 171 connected to a gate terminal of the transistor $T_M$ functions as a gate signal line for controlling each of the plurality of transistors $T_M$. In other words, based on the distribution control signal of the distribution control signal line 171, the transistor $T_M$ connected to the distribution control signal line 171 is controlled to be turned ON/OFF, thereby switching the connection destination of the output signal line 162$_M$.

In this embodiment, the distribution control signal lines 171 connected to the gate terminals of the transistors $T_{RM}$, $T_{GM}$, and $T_{BM}$ are referred to as "distribution control signal lines 171$_R$, 171$_G$, and 171$_B$", respectively. When the transistors $T_{RM}$, $T_{GM}$, and $T_{BM}$ become electrically conductive, the output signal line 162$_M$ and the data signal line $D_M$ are connected to each other.

The transistor $T_{RM}$ connects the data signal line $D_{RM}$ for red (R) pixel and the output signal line 162$_M$ of the source IC unit 160 to each other for a period during which a data signal for red (R) is output. Similarly, the transistor $T_{GM}$ connects the data signal line $D_{GM}$ for green (G) pixel and the output signal line 162$_M$ of the source IC unit 160 to each other for a period during which a data signal for green (G) is output. The transistor $T_{EN}$ connects the data signal line $D_{BM}$ for blue (B) pixel and the output signal line 162$_M$ of the source IC unit 160 to each other for a period during which a data signal for blue (B) is output.

Note that, in this embodiment, description is given of an example where one horizontal scanning period is divided into three in a time sharing manner so that the data signals are repeatedly output from the source IC unit 160 in order of blue (B), green (G), and red (R). In other words, description is given of an example where the output signal line 162$_M$ is repeatedly connected to the data signal lines $D_{BM}$, $D_{GM}$, and $D_{RM}$ in the stated order.

As illustrated in FIG. 2, the fluctuation suppression unit 173$_M$ includes cancellers $C_{B1M}$, $C_{B2M}$, and $C_{GM}$ (hereinafter sometimes collectively referred to simply as "canceller $C_M$"). The canceller $C_M$ is connected to the distribution control signal line 171 (gate signal line) for controlling any one of the plurality of transistors $T_M$, and suppresses, in accordance with the distribution control signal (gate signal) of the connected distribution control signal line 171, a voltage fluctuation in the data signal which occurs when another transistor $T_M$ changes from the ON state to the OFF state. Note that, the "another transistor $T_M$" is a transistor $T_M$ whose source or drain is connected to the canceller $C_M$.

The canceller $C_M$ is formed of a capacitive element having a given electrostatic capacitance. In this embodiment, description is given of an example where the canceller $C_M$ is formed of a transistor whose source and drain are electrically connected to each other and whose gate electrode is connected to the distribution control signal line 171. The source or drain of the canceller $C_M$ is connected to the source or drain of another transistor $T_M$. The canceller $C_M$ outputs a signal in anti-phase to the distribution control signal input to the another transistor $T_M$, to thereby suppress the voltage fluctuation in the data signal caused by the feedthrough voltage. In other words, the canceller $C_M$ can be regarded as an element for providing the data signal with a potential increase corresponding to a potential drop caused by the feedthrough voltage generated in the another transistor $T_M$.

Note that, the feedthrough voltage in this embodiment refers to a potential drop of the data signal which occurs when the transistor $T_M$ changes from the ON state to the OFF state. For example, the potential drop occurs due to the parasitic capacitance formed between the gate electrode of the transistor $T_M$ and the drain electrode and/or the source electrode thereof. In other words, when the data signal is affected by the feedthrough voltage, the potential of the data signal line $D_{RM}$ decreases by the feedthrough voltage. As a result, an accurate grayscale voltage may not be applied to the pixel electrode of the pixel portion 150.

To deal with this problem, in this embodiment, the canceller $C_M$ is used to suppress the voltage fluctuation in the data signal caused by the feedthrough voltage of the transistor $T_M$. In this case, the cancellers $C_{B1M}$ and $C_{B2M}$ suppress a voltage fluctuation caused by a feedthrough voltage of the transistor $T_{BM}$, and the canceller $C_{GM}$ suppresses a voltage fluctuation caused by a feedthrough voltage of the transistor $T_{GM}$.

Further, in this embodiment, the canceller $C_M$ suppresses the voltage fluctuation in the data signal in accordance with a change in the distribution control signal (gate signal) of the connected distribution control signal line 171 in a period from when another transistor $T_M$ has changed from the ON state to the OFF state until the write timing of the data signal.

The write timing of the data signal is timing at which a grayscale voltage indicated by the data signal is applied to the pixel electrode, and is controlled by the scanning signal of the scanning signal line $G_N$. For example, the write timing of the data signal is set to be timing at which a data signal line $D_M$ to be connected to the output signal line 162$_M$ last from among the plurality of data signal lines $D_M$ (such as the data signal line $D_{RM}$) is disconnected. In this embodiment, timing at which the output signal line 162$_M$ and the data signal line $D_{RM}$ are disconnected from each other, that is, timing at which the transistor $T_{RM}$ changes from the ON state to the OFF state is set as the write timing of the data signal.

Further, in this embodiment, the transistor $T_M$ controlled by the distribution control signal line 171 connected to the canceller $C_M$ changes from the OFF state to the ON state when another transistor $T_M$ changes from the ON state to the OFF state. The canceller $C_M$ suppresses a voltage fluctuation in the data signal in accordance with the distribution control signal (gate signal) for controlling the transistor $T_M$ controlled by the connected distribution control signal line 171 so as to change from the OFF state to the ON state. In other words, when another transistor $T_M$ changes from the ON state to the OFF state, a distribution control signal in anti-phase to that of the another transistor $T_M$ is input to the canceller $C_M$, with the result that the canceller $C_M$ outputs a voltage fluctuation in anti-phase to the voltage fluctuation occurring in the another transistor $T_M$.

Figure 3:
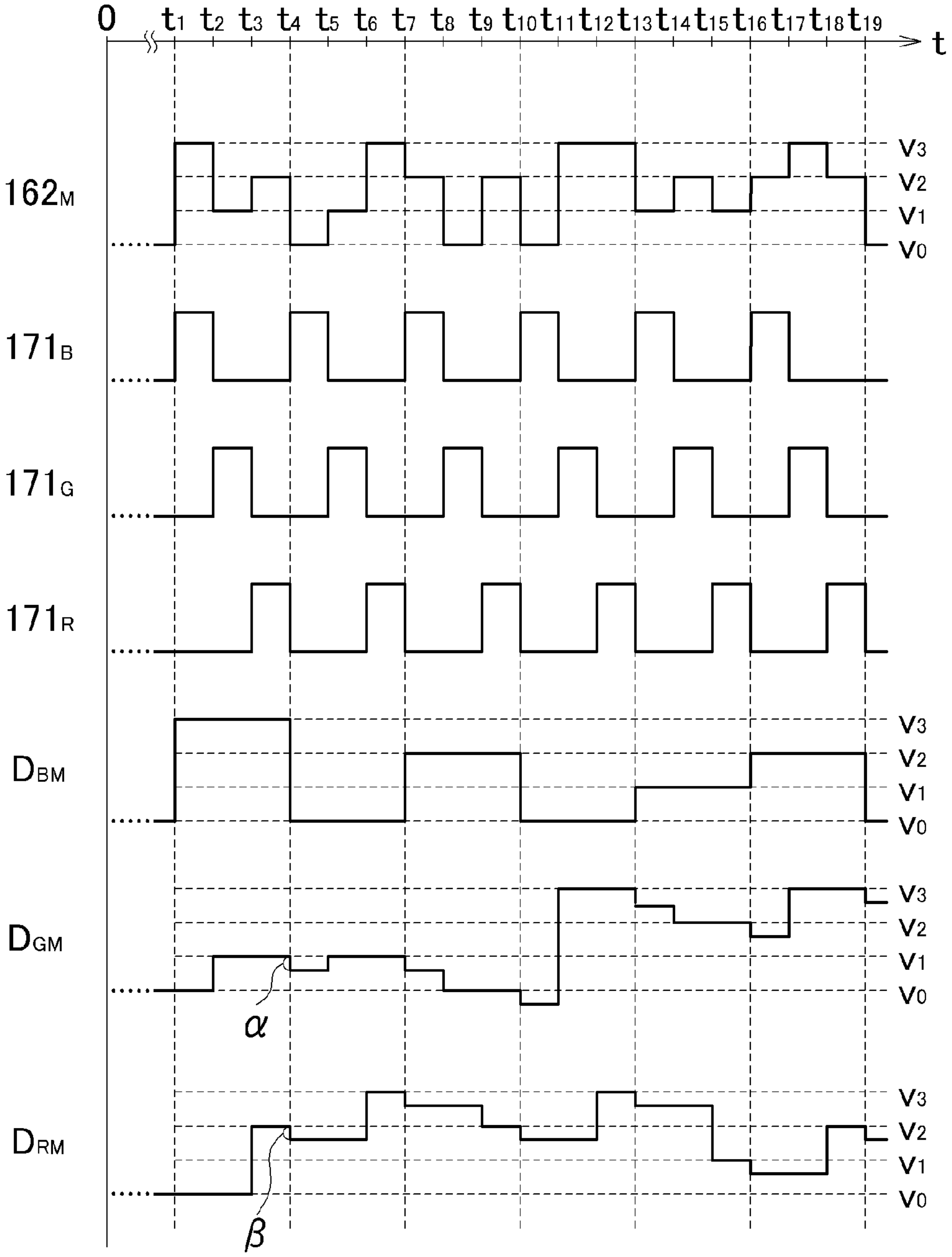
FIG. 3 is a timing chart illustrating how a canceller suppresses a voltage fluctuation caused by a feedthrough voltage.

FIG. 3 is a timing chart illustrating how the canceller $C_M$ suppresses the voltage fluctuation caused by the feedthrough voltage. The t axis illustrated in FIG. 3 represents the time axis. First, description is given below of a data signal to be input to a blue (B) pixel.

As illustrated in FIG. 3, when the potential of the distribution control signal line 171$_B$ becomes High (ON voltage) at time $t_1$, the transistor $T_{BM}$ becomes the ON state (conductive state) to connect the data signal line $D_{BM}$ and the output signal line $162_M$ to each other, with the result that the data signal line $D_{BM}$ has a potential $V_3$.

Next, when the potential of the distribution control signal line $171_B$ becomes Low (OFF voltage) at time $t_2$, the transistor $T_{BM}$ becomes the OFF state (non-conductive state), and hence a feedthrough voltage is generated due to the parasitic capacitance of the transistor $T_{BM}$. In other words, the potential of the data signal line $D_{BM}$ which has been originally connected to the transistor $T_{BM}$, becomes a potential obtained by subtracting a drop caused by the feedthrough voltage from the potential $V_3$.

At time $t_2$, however, the potential of the distribution control signal line $171_G$ becomes High, and hence a voltage increase occurs due to the parasitic capacitance of the canceller $C_{B1M}$ connected to the distribution control signal line $171_G$, and the voltage increase cancels out the feedthrough voltage drop corresponding to the transistor $T_{BM}$. In other words, the potential of the data signal line $D_{BM}$ is maintained to be the potential $V_3$.

Next, when the potential of the distribution control signal line $171_G$ becomes Low at time $t_3$, a feedthrough voltage is generated due to the parasitic capacitance of the canceller $C_{B1M}$ connected to the distribution control signal line $171_G$. At time $t_3$, however, the potential of the distribution control signal line $171_R$ becomes High, and hence a voltage increase occurs due to the parasitic capacitance of the canceller $C_{B2M}$ connected to the distribution control signal line $171_R$, and the voltage increase cancels out the feedthrough voltage drop generated in the canceller $C_{B1M}$. In other words, the potential of the data signal line $D_{BM}$ is maintained to be the potential $V_3$.

Then, when the write timing to the pixel portion 150 has come at time $t_4$, the voltage $V_3$ is applied to the pixel electrode of the pixel portion 150 corresponding to blue (B).

Next, description is given of writing to a green (G) pixel.

As illustrated in FIG. 3, when the potential of the distribution control signal line $171_G$ becomes High at time $t_2$, the transistor $T_{GM}$ connected to the distribution control signal line $171_G$ becomes the ON state to connect the data signal line $D_{GM}$ and the output signal line $162_M$ to each other, with the result that the data signal line $D_{GM}$ has a potential $V_1$. Next, when the potential of the distribution control signal line $171_G$ becomes Low at time $t_3$, the transistor $T_{GM}$ connected to the distribution control signal line $171_G$ becomes the OFF state, and hence a feedthrough voltage is generated due to the parasitic capacitance of the transistor $T_{GM}$. In other words, the potential of the data signal line $D_{GM}$, which has been originally connected to the transistor $T_{GM}$, becomes a potential obtained by subtracting a drop caused by the feedthrough voltage from the potential $V_1$.

At time $t_3$, however, the potential of the distribution control signal line $171_R$ becomes High, and hence a voltage increase occurs due to the parasitic capacitance of the canceller $C_{GM}$ connected to the distribution control signal line $171_R$, and the voltage increase cancels out the feedthrough voltage drop corresponding to the transistor $T_{GM}$. In other words, the potential of the data signal line $D_{GM}$ is maintained to be the potential $V_1$.

Then, when the write timing to the pixel portion 150 has come at time $t_4$, writing to the pixel portion 150 corresponding to green (G) is performed, and the voltage $V_1$ is applied to the pixel electrode.

Note that, at time $t_4$, when the potential of the distribution control signal line $171_R$ becomes Low, a voltage drop occurs due to the parasitic capacitance of the canceller $C_{GM}$ connected to the distribution control signal line $171_R$, with the result that the potential of the data signal line $D_{GM}$ becomes a potential obtained by subtracting the voltage drop (the amount of potential drop is represented by $\alpha$) from the voltage $V_1$ (times $t_4$ and $t_5$). However, before the voltage drop occurs, writing to the pixel portion 150 corresponding to green (G) has already been performed based on the voltage $V_1$. Thus, the voltage fluctuation in the data signal does not affect the display control.

Finally, description is given of writing to a red (R) pixel.

As illustrated in FIG. 3, when the potential of the distribution control signal line $171_R$ becomes High at time $t_3$, the transistor $T_{RM}$ connected to the distribution control signal line $171_R$ becomes the ON state to connect the data signal line $D_{RM}$ and the output signal line $162_M$ to each other, with the result that the data signal line $D_{RM}$ has a potential $V_2$.

Then, when the write timing to the pixel portion 150 has come at time $t_4$, writing to the pixel portion 150 corresponding to red (R) is performed, and the voltage $V_2$ is applied to the pixel electrode.

Note that, at time $t_4$, when the potential of the distribution control signal line $171_R$ becomes Low, a voltage drop (the amount of potential drop is represented by $\beta$) occurs due to the parasitic capacitance of the transistor $T_{RM}$ connected to the distribution control signal line $171_R$, with the result that the potential of the data signal line $D_{RM}$ becomes a potential obtained by subtracting the voltage drop from the voltage $V_2$ (times $t_4$ to $t_6$). However, before the voltage drop occurs, writing to the pixel portion 150 has already been performed based on the voltage $V_2$. Thus, the fluctuation of the grayscale voltage does not affect the display control.

In the above description, the voltage fluctuation in the data signal is suppressed during times $t_1$ to $t_4$. However, the voltage fluctuation caused by the feedthrough voltage is also suppressed at subsequent times similarly.

As described above, in the liquid crystal display device 1 according to this embodiment, the canceller $C_M$ driven by the distribution control signal of the distribution control signal line 171 suppresses the voltage fluctuation caused by the feedthrough voltage of the transistor $T_M$ in accordance with the distribution control signal. Any additional signal line or the like is not required to suppress the voltage fluctuation caused by the feedthrough voltage. Thus, the influence of the feedthrough voltage can be reduced while achieving downsizing and power saving of the liquid crystal display device 1.

Further, the canceller $C_M$ suppresses the voltage fluctuation in the data signal in the period until the write timing to the pixel portion 150. Thus, the potential of the data signal can be maintained until the write timing, and hence an accurate grayscale voltage can be applied to the pixel electrode.

Further, at the timing at which a potential drop occurs due to the feedthrough voltage, a potential increase for cancelling out the potential drop can be applied to the data signal.

Note that, the present invention is not limited to the embodiment described above, and can be subjected to various modifications without departing from the gist of the present invention.

For example, in this embodiment, the data signals are input in order of blue (B), green (G), and red (R) between a write timing and the next write timing, but the data signals are only required to be input in a predetermined order. Alternatively, for example, the data signals may be input in order of red (R), green (G), and blue (B). In this case, two cancellers $C_M$ are disposed between the transistor $T_{RM}$ and the data signal line $D_{RM}$, and are driven by the distribution control signal lines $171_G$ and $171_B$, respectively. In addition, in this case, the cancellers $C_{B1M}$ and $C_{B2M}$ are unnecessary.

Further, for example, in this embodiment, the color filter of three colors is used. Alternatively, however, a color filter of four colors (such as red (R), green (G), blue (B), and yellow (Y)) maybe used. The cancellers $C_M$ are disposed in accordance with the number of colors of the color filter so as to suppress a voltage fluctuation caused by a feedthrough voltage.

Description is now given of an example where the liquid crystal display device 1 has a color filter of n colors. In this case, in the liquid crystal display device 1, n data signal lines $D_M$ corresponding to the n colors are connected as one set to the output signal line $\mathbf{162}_M$ in order in a time sharing manner. In the distribution unit $\mathbf{172}_M$, n transistors $T_M$ are disposed, and the n transistors $T_M$ are driven by n distribution control signal lines 171.

In this case, between the source or drain of the transistor $T_M$ corresponding to an m-th (m is a natural number of 1 to n−1) data signal line $D_M$ to be connected to the output signal line $\mathbf{162}_M$ among the n data signal lines $D_M$ and the m-th data signal line $D_M$, n-m cancellers $C_M$ are connected. Then, the respective n-m cancellers $C_M$ are connected to the distribution control signal lines 171 for controlling the transistors $T_M$ corresponding to the (m+1) th to n-th data signal lines $D_M$ to be connected to the output signal line $\mathbf{162}_M$.

For example, the distribution control signal is supplied so that, when the distribution control signal line 171 for controlling the transistor $T_M$ corresponding to the m-th data signal line $D_M$ to be connected to the output signal line $\mathbf{162}_M$ changes from High to Low, the distribution control signal line 171 for controlling the transistor $T_M$ corresponding to the (m+1)th data signal line $D_M$ to be connected to the output signal line $\mathbf{162}_M$ may change from Low to High.

Note that, the scanning signal of the scanning signal line $G_N$ is controlled so that the write timing may come when the distribution control signal line 171 for controlling the transistor $T_M$ corresponding to the n-th data signal line $D_M$ to be connected to the output signal line $\mathbf{162}_M$ changes from High to Low.

Regardless of how many colors the color filter has, by supplying the distribution control signal to the cancellers $C_M$ arranged as described above, the voltage fluctuation in the data signal caused by the feedthrough voltage generated in the transistor $T_M$ can be suppressed similarly to the embodiment.

For example, the color filter arrangement may be the stripe arrangement described in the embodiment, or alternatively, for example, the mosaic arrangement where the same color is arranged diagonally or the delta arrangement where different colors are arranged like a triangle.

In this embodiment, the application of the display device according to the present invention to a liquid crystal display device has been exemplified. However, the display device according to the present invention is not limited to a liquid crystal display device, but is applicable to a display device in which a data signal from the data signal line is supplied to each pixel in a time sharing manner. Alternatively, for example, the display device according to the present invention may be applied to an organic EL display device.

Figure 4:
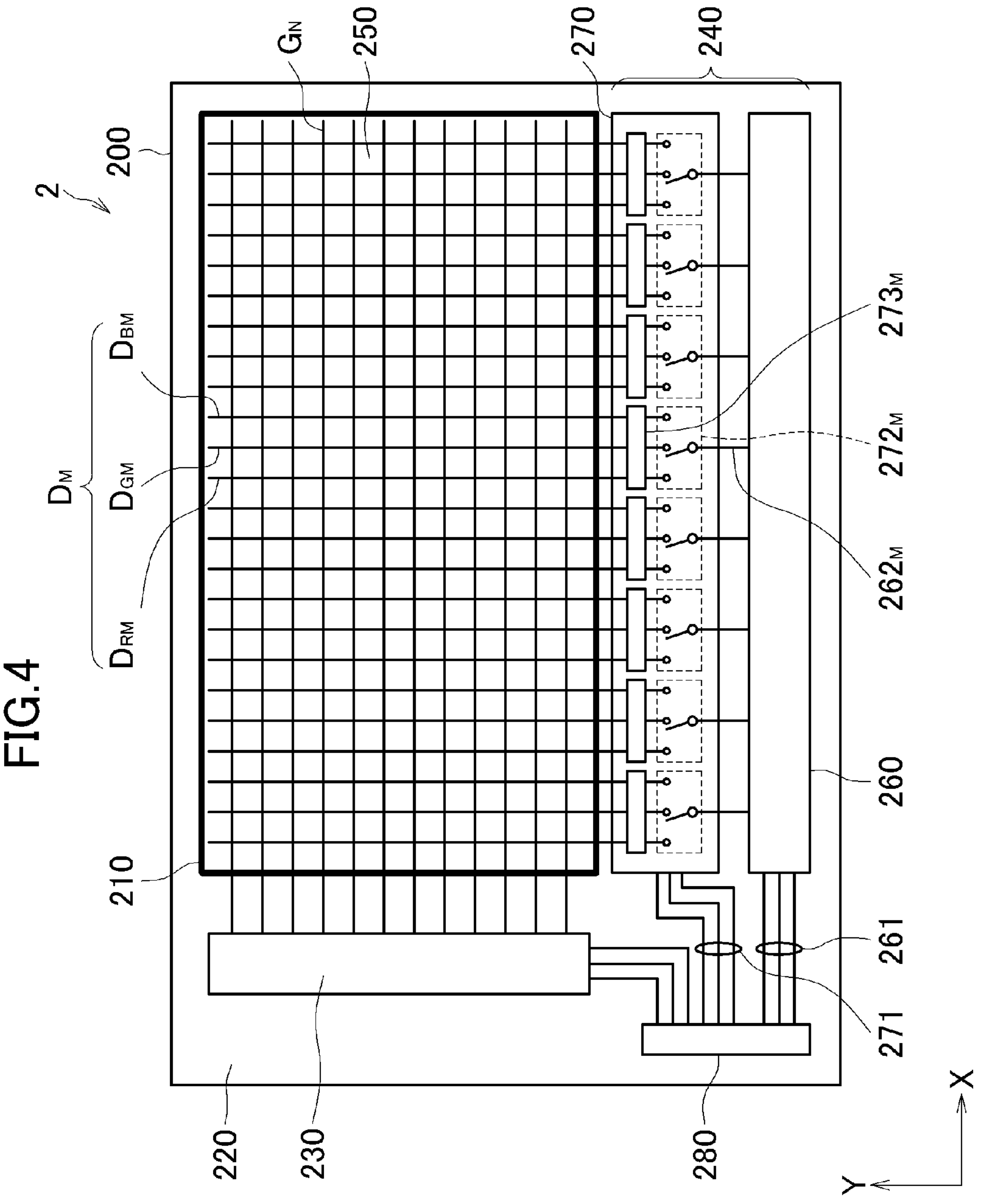
FIG. 4 is a diagram illustrating a schematic configuration of an organic EL display device.

FIG. 4 is a diagram illustrating a schematic configuration of an organic EL display device. As illustrated in FIG. 4, an organic EL display device 2 includes an organic EL display panel 200, a substrate 210 on which pixel portions 250 are arranged at a predetermined aspect ratio, a TFT substrate 220 for controlling organic EL elements, a scanning signal drive circuit 230 for controlling TFTs, and a data signal drive circuit 240 for supplying data signals to the pixel portions 250. The data signal is supplied to the pixel portion 250, and a given voltage is applied to an organic EL thin film of the pixel portion 250, thereby performing display control.

Similarly to the liquid crystal display device 1 described in the embodiment, various signals for controlling the scanning signal drive circuit 230 and the data signal drive circuit 240 are supplied from a controller 280. Also similarly to the embodiment, the data signal drive circuit 240 includes a source IC unit 260 and a distribution control unit 270, which are supplied with signals from the controller 280 via a data bus line 261 and a distribution control signal line 271, respectively.

Also in the organic EL display device 2, the data signal output from the source IC unit 260 is supplied to data signal lines $D_M$ in a time sharing manner via an output signal line $\mathbf{262}_M$ under control of the distribution control unit 270. In the case where the distribution control unit 270 distributes the data signals, the influence of the feedthrough voltage cannot be ignored when the transistors for performing the distribution are switched from the ON state to the OFF state. However, the organic EL display device 2 includes a fluctuation suppression unit $\mathbf{273}_M$, and hence a voltage drop caused by the feedthrough voltage can be suppressed. Note that, the distribution control unit 270 of the organic EL display device 2 has the same layout as the distribution control unit 170 of the liquid crystal display device 1.

Figure 5:
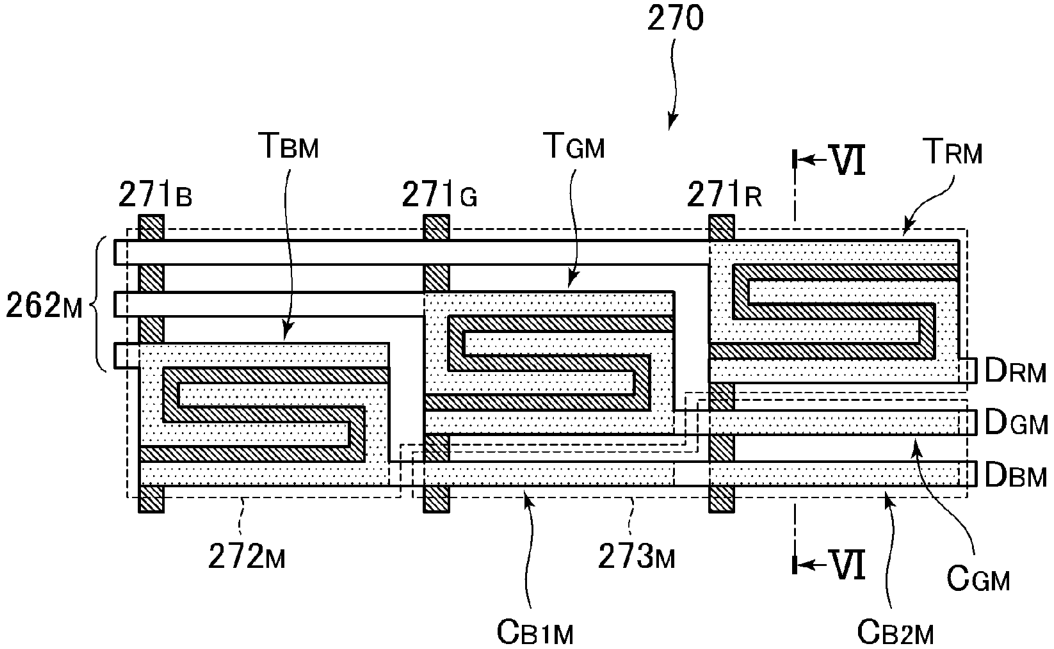
FIG. 5 is a plan view illustrating the layout of a distribution control unit of a liquid crystal display device and a distribution control unit of an organic EL display device.

FIG. 5 is a plan view illustrating the layout of the distribution control unit 170 of the liquid crystal display device 1 and the distribution control unit 270 of the organic EL display device 2. The following exemplifies the layout of the distribution control unit 270 of the organic EL display device 2. The plan view of FIG. 5 illustrates the layout of the distribution control unit 270 when the organic EL display device is viewed from a direction perpendicular to the X axis and the Y axis of FIG. 4. As illustrated in FIG. 5, the distribution control unit 270 includes a distribution unit $\mathbf{272}_M$ and a fluctuation suppression unit $\mathbf{273}_M$.

As illustrated in FIG. 5, in the organic EL display device 2, the data signal supplied from the output signal line $\mathbf{262}_M$ is supplied to the data signal lines $D_{RM}$, $D_{GM}$, and $D_{BM}$ in a time sharing manner under control of the transistors $T_{BM}$, $T_{RM}$, and $T_{GM}$ (distribution unit $\mathbf{272}_M$) driven by gate signals of distribution control signal lines $\mathbf{271}_R$, $\mathbf{271}_G$, and $\mathbf{271}_B$, respectively. In a conventional organic EL display device, there are no cancellers $C_{B1M}$, $C_{B2M}$, and $C_{GM}$, and hence a voltage drop occurs due to the feedthrough voltage as described in the embodiment at the time of switching of ON/OFF of the transistors $T_{BM}$, $T_{RM}$, and $T_{GM}$. In the organic EL display device 2, however, a gate layer and a semiconductor layer are added to form the cancellers $C_{B1M}$, $C_{B2M}$, and $C_{GM}$ (fluctuation suppression unit 273), and hence the voltage drop can be cancelled out.

Figure 6:
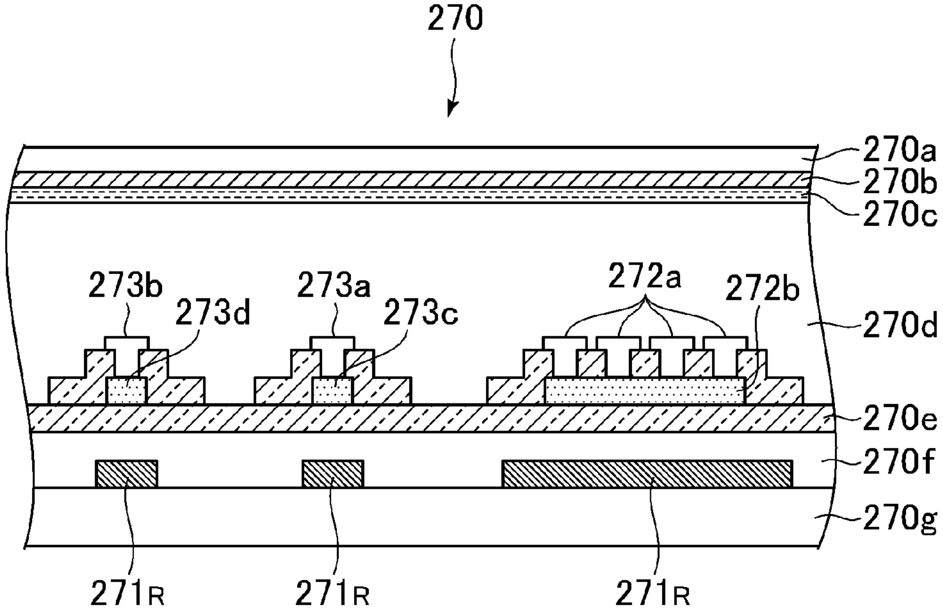
FIG. 6 is a cross-section view taken along the line VI-VI of FIG. 5.

FIG. 6 is a cross-section view taken along the line VI-VI of FIG. 5. As illustrated in FIG. 6, the fluctuation control unit $\mathbf{273}_M$ includes an insulating film 270*a* made of a nitride film or the like, and a glass substrate 270*g*, which are opposed to each other. The insulating film 270*a* and the glass substrate 270*g* are disposed so as to sandwich a source/drain metal 272*a*, a semiconductor layer (TAOS) 272*b* and the distribution control signal line (gate metal) $\mathbf{271}_R$, which form the transistor $T_{RM}$. Insulating films 270*e* and 270*f* are disposed between the source/drain metal 272*a* and the distribution control signal line $\mathbf{271}_R$. Note that, the insulating film 270*e* may be formed of an oxide film for preventing element degradation while the other insulating films may be formed of a nitride film. Between the source/drain metal 272*a* and the insulating film 270*a* a common metal (CIT metal) 270*b* a common ITO (CIT) 270*c* and an insulating film 270*d* are disposed.

As illustrated in FIG. 6, the canceller $C_{GM}$ includes a source/drain metal 273*a* a semiconductor layer 273*c* and the distribution control signal line $\mathbf{271}_R$. The canceller $C_{B2M}$ includes a source/drain metal 273*b* a semiconductor layer 273*d* and the distribution control signal line $\mathbf{271}_R$. Those cancellers $C_{GM}$ and $C_{B2M}$ are both driven by a gate signal of the distribution control signal line $\mathbf{271}_R$ to suppress the influence of a voltage fluctuation in the data signal caused by the feedthrough voltage. As described above, the display device according to the present invention may be applied to an organic EL display device so as to suppress the influence caused by the feedthrough voltage.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A display device, comprising:

a data signal generation unit for generating a data signal for controlling a plurality of pixels;

a plurality of transistors for supplying the data signal output from the data signal generation unit to a plurality of data signal lines of a display panel in a time sharing manner;

a gate signal line for controlling each of the plurality of transistors; and a fluctuation suppression unit for suppressing a voltage fluctuation in the data signal which occurs when the plurality of transistors changes from an ON state to an OFF state, wherein the plurality of transistors include a first transistor and a second transistor, the fluctuation suppression unit connects to one of a source and a drain of the first transistor, and the gate signal line for controlling the second transistor directly connects to the second transistor with the fluctuation suppression unit.

2. The display device according to claim 1, wherein:

the gate signal line is connected to the fluctuation suppression unit, and the second transistor, which is controlled by the gate signal line, changes from the OFF state to the ON state when the first transistor changes from the ON state to the OFF state;

the fluctuation suppression unit suppresses the voltage fluctuation in the data signal emitted from the first transistor; and a gate signal of the gate signal line which controls the fluctuation suppression unit so as to change from the OFF state to the ON state, controls the second transistor so as to change from the OFF state to the ON state.

3. The display device according to claim 1, wherein:

the plurality of pixels include a first pixel and a second pixel, the first pixel is controlled by a first data signal emitted from the first transistor and the second pixel is controlled by a second data signal emitted from the second transistor, the timing when the first data signal inputs the first pixel is substantially the same as the timing when the second data signal inputs the second pixel.

4. The display device according to claim 1, wherein:

at least one of the first transistor and the second transistor is formed by a semiconductor.

5. The display device according to claim 1, wherein:

the data signal generation unit inputs the data signal to the plurality of transistors through an output signal line.

* * * * *